(12) United States Patent
Hu

(10) Patent No.: US 8,533,495 B2
(45) Date of Patent: Sep. 10, 2013

(54) POWER SUPPLY CIRCUIT FOR VIDEO CARD CHIPSET

(75) Inventor: Ke-You Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 983 days.

(21) Appl. No.: 12/578,169

(22) Filed: Oct. 13, 2009

(65) Prior Publication Data
US 2011/0029791 A1 Feb. 3, 2011

(30) Foreign Application Priority Data
Jul. 30, 2009 (CN) .......................... 2009 1 0305046

(51) Int. Cl.
*G06F 1/00* (2006.01)

(52) U.S. Cl.
USPC ........................................................ 713/300

(58) Field of Classification Search
USPC ..................... 713/300; 323/370; 367/39, 44, 367/47; 327/532
See application file for complete search history.

(56) References Cited

U.S. PATENT DOCUMENTS 6,473,510 B1 * 10/2002 Marsh .......................... 381/94.6

\* cited by examiner

*Primary Examiner* — Jaweed A Abbaszadeh
(74) *Attorney, Agent, or Firm* — Altis Law Group, Inc.

(57) ABSTRACT

A power supply circuit is capable of providing power to a video card chipset. The video card chipset includes a first power supply pin and a second power supply pin. The power supply circuit includes a power input, a first filtering circuit, and a second filtering circuit. The first filtering circuit is connected between the power source and the first power supply pin to filter the power provided to first power supply pin of the video card chipset. The second filtering circuit is connected between the power source and the second power supply pin to filter the power provided to second power supply pin of the video card chipset.

4 Claims, 2 Drawing Sheets

POWER SUPPLY CIRCUIT FOR VIDEO CARD CHIPSET

BACKGROUND

1. Technical Field

The present disclosure related to power supply circuits, and particularly to a power supply circuit for a video card chipset.

2. Description of Related Art

With the rapid development of computer technology, more and more people use computers throughout the work day. Therefore, it is important that the display function works well and provides clear images to prevent causing eye strain or other problems for people.

In a computer system, a video card chipset transmits signals to the display. When power provided to the video card chipset is not stable, the signals provided to the display will not be stable and interfere with image quality of the display.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
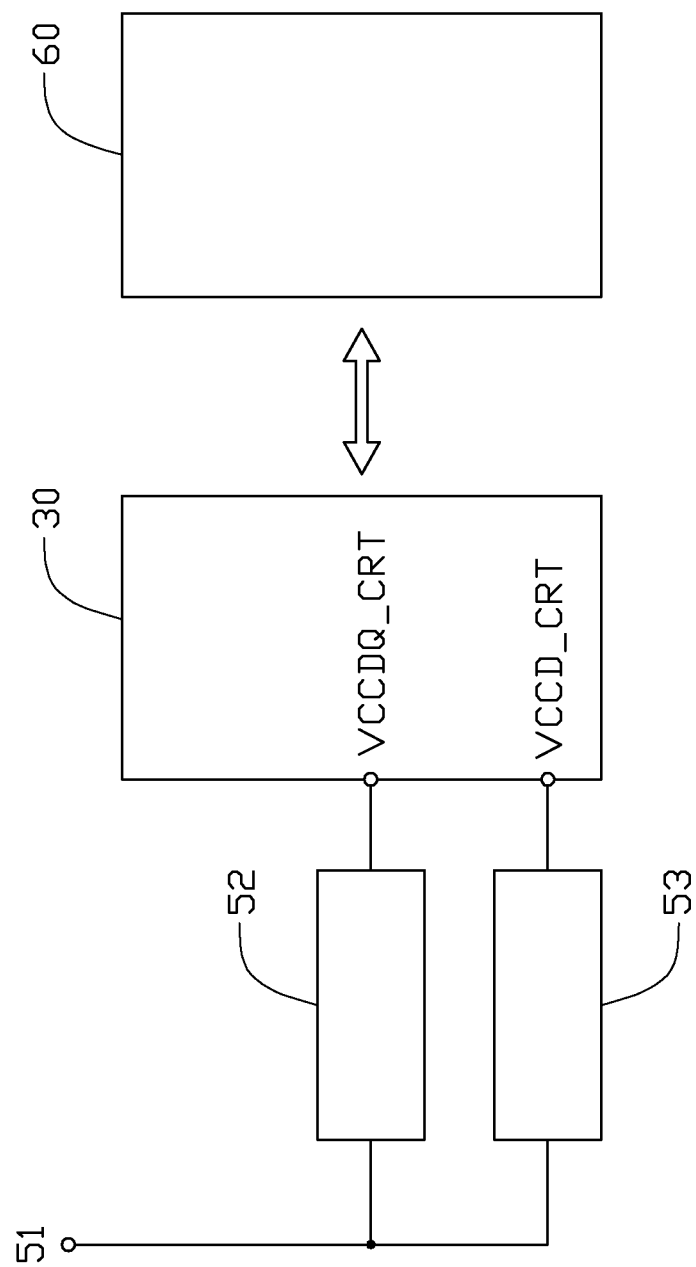
FIG. 1 is a block view of a power supply circuit for video card chipset.

Referring to FIG. 1, a power supply circuit for a video card chipset 30 includes a power input 51, a first filtering circuit 52, and a second filtering circuit 53. The video card chipset 30 is connected to a display 60, and provides signals to the display 60. In one embodiment, the power input 51 provides a +1.8V voltage.

The first chipset 30 includes a display digital quiet power supply pin VCCDQ_CRT and a display digital power supply pin VCCD_CRT. The power input 51 is connected to the pin VCCDQ_CRT via the first filtering circuit 52 and connected to the pin VCCD_CRT via the second filtering circuit 53. The first filtering circuit 52 and the second filtering circuit 53 are capable of filtering the power provided to the pins VCCDQ_CRT and VCCD_CRT. Therefore, power provided to the computer is stable.

Figure 2:
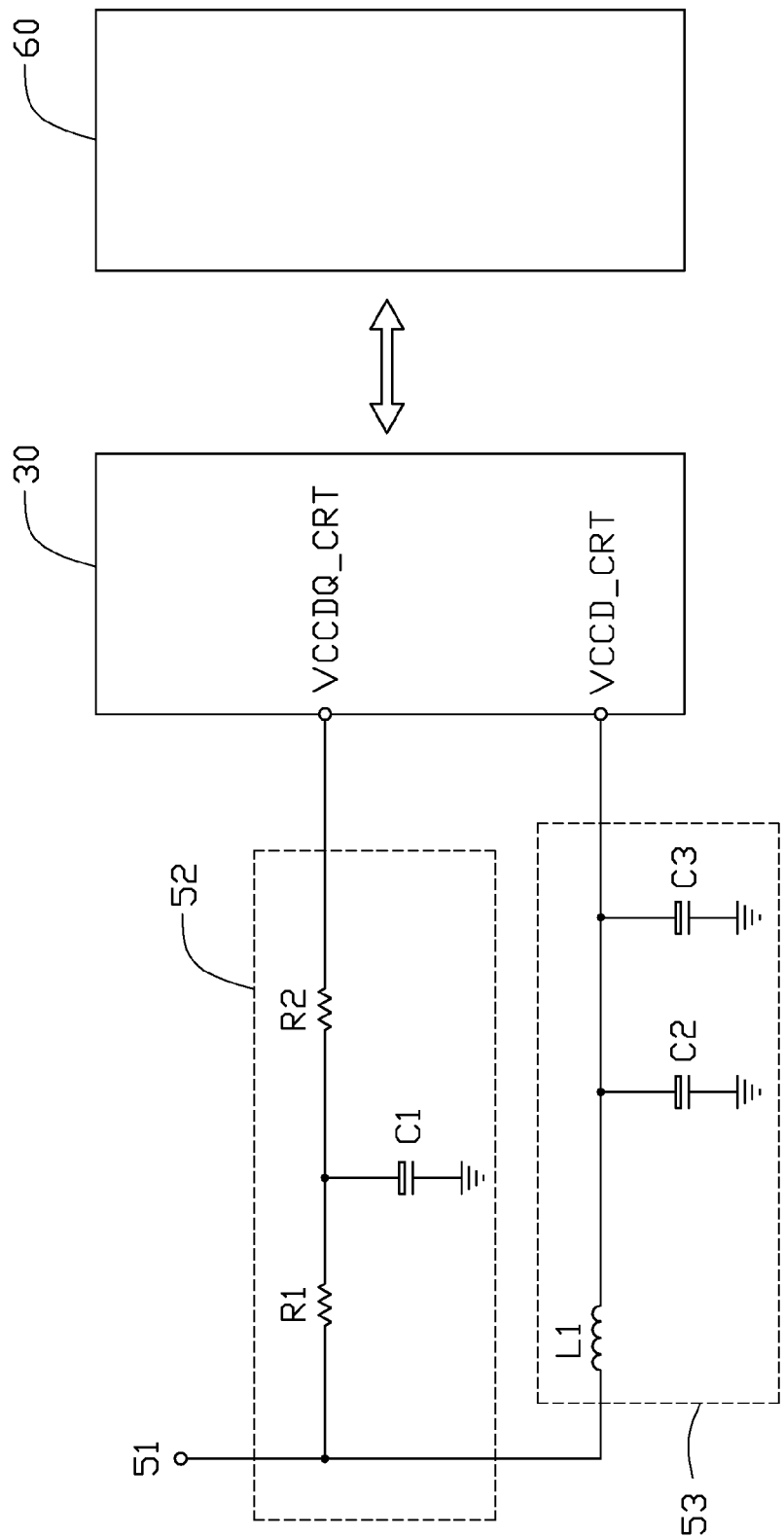
FIG. 2 is a circuit diagram of the power supply circuit of FIG. 1.

Referring to FIG. 2, the first filtering circuit 52 includes a first resistor R1, a second resistor R2, and a first capacitor C1. The first resistor R1 and the first capacitor C1 compose an RC circuit. One end of the RC circuit is connected to the power input 51. The other end of the RC circuit is connected to an end of the second resistor R2. The other end of the second resistor R2 is connected to the pin VCCDQ_CRT. In one embodiment, resistance of the first resistor R1 is 10 ohms, resistance of the second resistor R2 is 1 ohm, and capacitance of the first capacitor C1 is 1 microfarad.

The second filtering circuit 53 includes a first inductance L1, a second capacitor C2, a third capacitor C3. One end of the first inductance L1 is connected to the power input 51. The other end of the first inductance L1 is connected to the pin VCCD_CRT, one end of the second capacitor C2, and one end of the third capacitor C3. The other end of each of the second capacitor C2 and third capacitor C3 is connected to ground. In one embodiment, inductance of the first inductance L1 is 10 microhenries, capacitance of the second capacitor C2 is 4.7 microfarads, and capacitance of the third capacitor C3 is 0.1 microfarads.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A power supply circuit for a video card chipset, the video card chipset comprising a first power supply pin and a second power supply pin, the power supply circuit comprising:
   a power input;
   a first filtering circuit comprising a RC circuit connected between the power input and the first power supply pin, the first filtering circuit capable of filtering the power provided to the first power supply pin of the video card chipset; and
   a second filtering circuit connected between the power input and the second power supply pin capable of filtering the power provided to the second power supply pin of the video card chipset, the second filtering circuit comprising a first inductance, a second capacitor and a third capacitor, one end of the first inductance connected to the power input, the other end of the first inductance connected to the second power supply pin; and one end of the second capacitor and one end of the third capacitor connected to the second power supply pin, and the other end of each of the second capacitor and third capacitor connected to ground.

2. The power supply circuit of claim 1, wherein the first filtering circuit further comprises a second resistor connected between the RC circuit and the first power supply pin.

3. A system, comprising:
   a display;
   a video card chipset connected to the display, and providing signals to the display;
   a power input capable of providing power to the video card chipset;
   a first filtering circuit comprising a RC circuit connected between the power input and the first power supply pin, the first filtering circuit capable of filtering the power provided to the first power supply pin of the video card chipset; and
   a second filtering circuit connected between the power input and the second power supply pin capable of filtering the power provided to the second power supply pin of the video card chipset, the second filtering circuit comprising a first inductance, a second capacitor and a third capacitor, one end of the first inductance connected to the power input, the other end of the first inductance connected to the second power supply pin; and one end of the second capacitor and one end of the third capacitor connected to the second power supply pin, and the other end of each of the second capacitor and third capacitor connected to ground.

4. The system of claim 3, wherein the first filtering circuit further comprises a second resistor connected between the RC circuit and the first power supply pin.

* * * * *